US012636721B2

(12) United States Patent
Lin et al.

(10) Patent No.: US 12,636,721 B2
(45) Date of Patent: May 26, 2026

(54) WIRE ELECTRODE FOR WIRECUT ELECTRICAL DISCHARGE MACHINING WITH CARBONACEOUS SURFACE LAYER AND THE PREPARATION METHODS THEREOF

(71) Applicant: Berkenhoff GmbH, Heuchelheim (DE)

(72) Inventors: Huogen Lin, Ningbo (CN); Xianqui Meng, Ningbo (CN); Tong Wu, Ningbo (CN); Meijun Hu, Ningbo (CN); Hongfang Gu, Ningbo (CN); Yibo Chen, Ningbo (CN); Zhining Liang, Ningbo (CN); Tobias Nöthe, Herborn (DE)

(73) Assignee: BERKENHOFF GMBH, Heuchelheim (DE)

( * ) Notice: Subject to any disclaimer, the term of this patent is extended or adjusted under 35 U.S.C. 154(b) by 1071 days.

(21) Appl. No.: 17/595,275

(22) PCT Filed: Apr. 1, 2020

(86) PCT No.: PCT/EP2020/059269
§ 371 (c)(1),
(2) Date: Nov. 12, 2021

(87) PCT Pub. No.: WO2020/229046
PCT Pub. Date: Nov. 19, 2020

(65) Prior Publication Data
US 2022/0258262 A1      Aug. 18, 2022

(30) Foreign Application Priority Data
May 14, 2019      (CN) ......................... 201910396877.X

(51) Int. Cl.
*B23H 1/06*          (2006.01)
*B23H 7/08*          (2006.01)
(Continued)

(52) U.S. Cl.
CPC ................. *B23H 1/06* (2013.01); *B23H 7/08* (2013.01); *C25D 3/22* (2013.01); *C25D 5/34* (2013.01); *C25D 5/50* (2013.01); *C25D 7/0607* (2013.01)

(58) Field of Classification Search
CPC .............. B23H 1/06; B23H 7/08; C25D 3/22; C25D 5/34; C25D 5/50; C25D 5/605; C25D 7/0607
See application file for complete search history.

(56) References Cited

U.S. PATENT DOCUMENTS 4,740,666 A * 4/1988 Tomalin ................... B23H 7/08
                                                              428/677
2013/0037523 A1* 2/2013 Seong ................... C23C 28/023
                                                              148/284
(Continued)

FOREIGN PATENT DOCUMENTS

CN          110125499          8/2019
EP          3 053 6881 A1      8/2016
(Continued)

OTHER PUBLICATIONS

International Preliminary Report on Patentability issued in corresponding International application No. PCT/EP2020/059269 mailed Jul. 28, 2021.
(Continued)

*Primary Examiner* — Ibrahime A Abraham
*Assistant Examiner* — Joe E Mills, Jr.
(74) *Attorney, Agent, or Firm* — NORTON ROSE FULBRIGHT US LLP

(57)          ABSTRACT
A wire electrode for wirecut electrical discharge machining (WEDM) having a carbonaceous surface layer is disclosed. The wire electrode can include a core material, an outermost
(Continued)

carbonization layer, and a phase transition layer between the core material and the carbonization layer.

8 Claims, 1 Drawing Sheet

(51) Int. Cl.

| | | |
|---|---|---|
| *C25D 3/22* | (2006.01) | |
| *C25D 5/34* | (2006.01) | |
| *C25D 5/50* | (2006.01) | |
| *C25D 7/06* | (2006.01) | |

(56) References Cited

U.S. PATENT DOCUMENTS

| | | | |
|---|---|---|---|
| 2013/0119023 A1 | 5/2013 | Dandridge et al. | |
| 2016/0228964 A1* | 8/2016 | Perez | B23H 1/06 |

FOREIGN PATENT DOCUMENTS

| | | | |
|---|---|---|---|
| EP | 3053688 | B1 | 8/2016 |
| JP | S6125727 | A | 2/1986 |
| JP | S61 252025 | A | 11/1986 |

OTHER PUBLICATIONS

Office Action issued in corresponding Vietnamese Patent Application No. 1-2021-07942, dated Jun. 12, 2025. (English Translation Provided).

Office Action issued in corresponding Korean Patent Application No. 10-2021-7036025, dated Mar. 11, 2025. (English Translation Provided).

Hearing Notice issued in corresponding Indian Application No. 202127050368, dated Jun. 20, 2025.

"Metal Corrosion and Protection", *China Industry Press*, 1st print; 5 pages, 1961.

Decision of Rejection issued in corresponding Chinese Patent Application No. 2020800371096, dated Dec. 25, 2025.

* cited by examiner

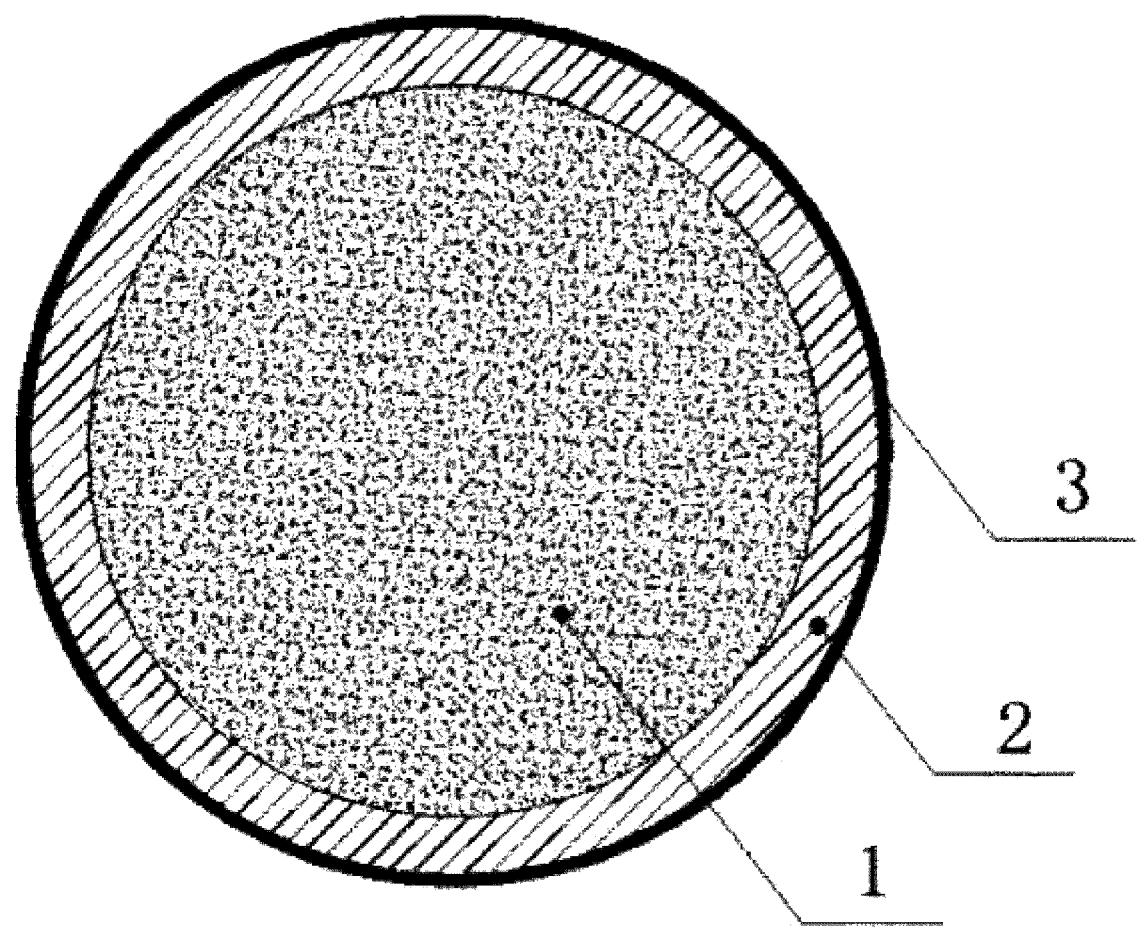

WIRE ELECTRODE FOR WIRECUT ELECTRICAL DISCHARGE MACHINING WITH CARBONACEOUS SURFACE LAYER AND THE PREPARATION METHODS THEREOF

CROSS-REFERENCE TO RELATED APPLICATIONS

This application is a national phase application under 35 U.S.C. § 371 of International Application No. PCT/EP2020/059269 filed Apr. 1, 2020, which claims the benefit of priority of Chinese Patent application Ser. No. 201910396877.X filed May 14, 2019. The contents of the referenced applications are incorporated into the present application by reference.

TECHNICAL FIELD

The present invention relates to the field of wirecut electrical discharge machining. More specifically, it relates to wire electrodes for wirecut electrical discharge machining having a carbonaceous surface layer and methods for their preparation.

BACKGROUND TECHNOLOGY

Wirecut electrical discharge machining is also referred to as WEDM herein. The principle in this technology is to use a wire electrode in continuous movement as the electrode to remove material of a metal work piece by pulsed spark discharges and achieve machine-based shaping of the work piece according to the set trajectory. As compared to other processing methods, WEDM has a better performance in terms of roundness error, linear error and dimensional error, and it is widely applied in aerospace manufacturing. Especially since 1980, with the gradual improvement of the precision of molds for precision machinery parts, home appliances and communication equipment, WEDM has become an indispensible processing method in the mold manufacturing industry. In recent years, automation and artificial intelligence have changed the world. An increasing amount of automation and artificial intelligence equipment has been applied in factories, families, medical institutions, etc. To meet the requirements of such high precision equipments, slow wire-electrical discharge machining has also entered into a new development stage of high dimensional accuracy, high surface finish and high efficiency. In addition to technical innovations related to WEDM machines, wire electrodes for WEDM are also an important motivator for its development. With the development of nearly 40 years, WEDM has witnessed the innovation of products of four generations.

The first generation wire electrode for WEDM is a copper wire. Due to excellent electrical conductivity and processing performance, copper is a preferred choice for wire electrodes for WEDM.

The second generation wire electrode for WEDM is a brass wire. According to related studies, the vaporization performance of a brass wire is superior to that of copper. In other words, under the same discharge intensity, a larger vaporization pressure can be generated, which can better remove the chips (formed in the cutting process), thereby increasing the processing speed. With the discovery of the brass wire characteristics and the maturity of the multi-mode continuous brass wire drawing process, the copper wire electrode has been completely replaced by the brass wire electrode.

The third generation wire electrode for WEDM is a galvanized wire. According to application studies, a pure zinc surface coating can eliminate the capacitive effect generated during the discharge, making the discharge more stable and continuous. Also, the surface finish of the processed work piece is greatly improved compared with the brass wire. For some high-end and high-precision molds and parts, galvanized wire processing is an ideal choice.

The fourth generation wire electrode for WEDM is a coated wire. The coated wire can be divided into a gamma-coated wire, a beta-coated wire and a composite-coated wire. According to application studies, high-zinc alloys (i.e. an alloy having a high content of zinc) on the surface of the wire can achieve higher discharge vaporization pressure. Therefore, a high-zinc alloy, coated on the surface, at a certain thickness helps improving the processing speed.

The wire electrodes for slow wire WEDM have undergone four generations of development. Their application performance has been greatly improved. In particular, the processing precision, surface finish and processing speed have been greatly improved compared with the first generation of copper wires. However, the developments of the industry will never satisfy the ever-changing demands. In the new manufacturing environments, new difficulties and challenges have arisen for users of WEDM processing. For example, further improving the processing speed of a galvanized wire while maintaining the desired precision, increasing the speed and precision of a coated wire, achieving/guaranteeing excellent threading performance of a coated wire, etc. are still technical problems to be solved by the industry to provide wire electrodes for WEDM having greater processing speed, higher processing accuracy, better surface finish and excellent wire feeding performance.

DETAILED DESCRIPTION

In order to solve the problems associated with of the above-mentioned deficiencies of current technology, the present invention provides a wire electrode for WEDM having a carbonaceous surface layer. The present invention also provides a method for preparing such a wire electrode.

Preferred embodiments as disclosed in the dependent claims.

As compared to a coated wire, the wire electrode of the present invention is characterized by a special structure that may improve processing speed by over 15%. The processing precision is also superior to that of the coated wire. The wire electrode of the present invention is easy to manufacture, and it exhibits greatly improved performance resulting in stronger market competitiveness as compared a coated wire.

The composition of the carbonization layer of the present invention (also referred to as "carbonized layer") has a carbon content of 0.1-99.0 wt %, a total content of aluminum and potassium of less than 0.5 wt %, wherein the remainder includes copper and zinc as well as other unavoidable impurity elements (oxygen, hydrogen and nitrogen).

The carbonized layer of the present invention has a thickness of 0.5 to 30 microns and exists on the outer surface of the phase transition layer in a continuous or intermittent (discontinuous) form. The carbonized layer is formed by a carbon precipitation reaction. As the carbonized layer is very dense on the surface of the finished product after being stretched by the drawing die, and the electrical conductivity is improved by 3-8% IACS, the accuracy during the discharge machining can reach up to ±0.002 mm.

The content of the unavoidable impurity elements in the carbonized layer in the present invention is preferably less than 0.5% by weight.

The core material of the present invention is preferably one of brass, copper and carbon steel.

The phase transition layer of the present invention comprises a copper-zinc phase structure composed of one, or two or more metal compounds selecting from the group of CuZn, Cu5Zn8, CuZn3. The reason why the above copper-zinc phase structure is adopted is that the CuZn phase structure has good electrical conductivity, is favorable for improving the positioning accuracy during the processing, and further improves the processing precision. The Cu5Zn8 phase structure has excellent vaporization performance, which is favorable for improving the flushing performance during the processing, thereby improving the processing speed. The CuZn3 phase structure can eliminate the capacitive effect generated during the discharge machining process, and thus improves the discharge stability under the weak current condition, thereby improving the surface finish of the processed workpiece.

Carbon in elemental form is also present in the phase transition layer of the present invention. The composition of the phase transition layer includes a content of elemental carbon of less than 50 wt %, wherein the remainder includes copper, zinc and other unavoidable impurity elements, i.e., oxygen, hydrogen, nitrogen, aluminum and potassium with a total mass percentage of less than 0.5 wt %.

The phase transition layer of the present invention has a thickness of 1 to 40 microns. The phase transition layer structure is prepared according to the different copper-zinc phase structures to obtain wire electrodes with improved processing precision, processing speed and surface finish. Different copper-zinc phase structure combinations will have different application characteristics.

The present invention also provides a method for preparing a wire electrode in accordance with the present invention suitable for slow WEDM having a carbonaceous surface layer, said method including the following preparation steps:

(1) preparing a brass wire blank, a copper wire blank or a carbon steel wire blank having a diameter of 0.3 to 1.5 mm by plating a layer of a mixture of zinc, CHO organic matter, for example, a dextrin such as dextrins having an average length of 3 to 15 glucose units, a polyethylene glycol and a short-chained carboxylic acid, wherein the chain length is such that the acid is soluble in water, aluminum salt and potassium salt on the surface of the wire by one of online continuous electroplating and hot dip plating, wherein the content of CHO organic matter in the mixture is less than 0.5%, wherein the content of aluminum and potassium salts is less than 0.5%, relative to the total mixture, and wherein the remainder is zinc, wherein the layer of the surface-plated mixture has a thickness of 1 to 30 µm on the surface of the blank;

(2) subjecting the plated blank to a carbon precipitation reaction, in a closed environment containing 90% or more of nitrogen, wherein the reaction temperature is 100 to 900° C., the reaction time is 0.5 s to 20 hrs, and the cooling temperature is controlled at below 100° C., wherein the temperature of the furnace is uniform within ±10° C.;

(3) cleaning the wire blank after the carbon precipitation reaction (carbonization) using a volatile aviation kerosene and pre-stretching and stress-relieving the wire blank to a diameter of 0.1 to 1.0 mm, the tensile speed of the pre-stretching step being form 100 to 900 m/min and the voltage of the stress-relieving annealing step being 5 to 100 V at an annealing current of from 5 to 100 A;

(4) placing the wire blank having a diameter of from 0.1 to 1.0 mm as obtained in step (3) in a furnace for an annealing treatment with the annealing conditions being as follows
nitrogen,
holding temperature 200 to 600° C.,
holding time 30 to 600 min,
cooling temperature controlled below 200° C., and
temperature uniformity in the furnace±10° C.;

(5) continuously drawing the annealed wire blank to a finished product diameter of 0.02 to 0.35 mm and subjecting it to stress relief annealing with the pass processing rate controlled at 5 to 25%, the total processing rate controlled at 50 to 89% and the tensile speed controlled at 500 to 1,800 m/min, wherein the stress relief annealing voltage is 20 to 40 V and the annealing current is 10 to 60 A.

An alternative method for preparing a wire electrode of the present invention comprises the following steps:

(1) preparing a brass wire blank, a red copper wire blank or a carbon steel wire blank having a wire diameter of 0.3-1.5 mm by plating a layer of a mixture of zinc CHO organic matter, for example dextrins such as dextrins having an average length of 3 to 15 glucose units, polyethylene glycols or short-chained carboxylic acids, wherein the chain length is such that the acid is soluble in water, aluminum and potassium salts on the surface of the wire by one of on-line continuous plating and hot dip plating, wherein the content of the CHO organic matter is less than 0.5%, wherein the content of aluminum and potassium is less than 0.5% (in total), and wherein the remainder is zinc, the layer of the surface-plated mixture having a thickness of 1-30 micrometers on the surface of the blank;

(2) subjecting the plated blank to a carbon precipitation reaction in a closed environment containing either 90% or more of nitrogen or being of normal atmospheric composition, wherein the reaction temperature is 100-900° C., the reaction time is 0.5 seconds to 40 hours, and the cooling temperature is controlled at below 100° C., the furnace temperature uniformity is up to ±10° C.;

(3) continuously drawing the above-mentioned annealed wire blank to a finished product of 0.05-0.35 mm diameter and subjecting it to stress relief annealing with the pass processing rate controlled at 5-25%, the total processing rate controlled at 50-98%, and the drawing speed controlled at 500-1,800 m/min, wherein the stress relief annealing voltage is 20-40 V, and the annealing current is 10-60 A.

Since the aforementioned method only includes three steps, the preparation of the above-mentioned surface carbon-containing wire electrode for slow wire EDM becomes more efficient.

Yet another method for preparing the wire electrode of the present invention comprises the steps of:

(1) preparing a brass wire blank, a red copper wire blank or a carbon steel wire blank having a diameter of 0.3-1.5 mm by plating a layer of a mixture of zinc, CHO organic matter, for example dextrins, such as dextrins having an average length of 3 to 15 glucose units, polyethylene glycols or short-chained carboxylic acids, wherein the chain length is such that the acid is soluble in water, aluminum and potassium salts on the surface of the wire by one of on-line continuous plating and hot dip plating, wherein the content of the CHO organic matter is less than 0.5%, wherein the content of the aluminum and potassium salts is less than 0.5% (in total), and wherein the remainder is zinc, wherein the layer of the surface-plated mixture has a thickness of 1-30 micrometers;

(2) subjecting the plated blank to a carbon precipitation reaction in a closed environment containing either 90% or more of nitrogen or being of normal atmospheric composition, wherein the reaction temperature is 100-900° C., the reaction time is 0.5 seconds to 20 hours, and the cooling temperature is controlled at below 100° C., wherein the furnace temperature uniformity is up to ±10° C., and wherein, besides the carbon precipitation reaction, within this step a transition layer essentially consisting of the copper-zinc phase $Cu_5Zn_8$ is formed;

(3) pre-stretching the wire blank after the carbon precipitation reaction is to a diameter of 0.1-1.0 mm with the drawing speed of the pre-stretching being of from 100-900 m/min;

(4) subjecting the drawn blank to a heat treatment in a closed environment containing either 90% or more of nitrogen or being of normal atmospheric composition, wherein the reaction temperature is 100-900° C., the reaction time is 0.5 seconds to 40 hours, and the cooling temperature is controlled at below 100° C., the furnace temperature uniformity being up to ±10° C., and wherein within this step the transition layer essentially consisting of the copper-zinc phase $Cu_5Zn_8$ is converted to a transition layer essentially consisting of the copper-zinc phase $CuZn$, (5) continuously drawing the so-obtained annealed wire blank to a finished product of 0.02-0.35 mm diameter and subjecting it to stress relief annealing with the per pass processing rate controlled at 5-25%, total processing rate controlled at 50-98%, and the drawing speed controlled at 500-1,800 m/min, wherein the stress relief annealing voltage is 20-40 V, and the annealing current is 10-60 A.

The surface roughness of the wire blank ranges from Ra 0.05 to 0.2 μm after coating in accordance with the present invention.

The final product of the present invention has a tensile strength of 500-2,500 MPa and a conductivity of 15-95% IACS. The processing speed of the wire electrode of the present invention is 1.15-1.35 times higher than that of a coated wire as discussed above.

The present invention is associated with the following significant improvements and beneficial effects as compared to wire electrodes for WEDM in the prior art and the preparation methods thereof:

(1) The surface layer of the wire electrode of the present invention is designed as a carbonization layer of 0.5-30 micrometers thickness, which has better conductivity. The conductivity can be increased by 3-8% IACS compared to the wire without a carbonized layer. Better electrode surface conductivity can effectively improve the positioning accuracy of the WEDM machine, thus improving the processing accuracy of WEDM.

(2) By selecting in particular dextrins, such as dextrins having an average length of 3 to 15 glucose units, polyethylene glycols or short-chained carboxylic acids, wherein the chain length is such that the acid is soluble in water, or mixtures thereof as CHO matter with a concentration of less than 0.3% in the mixture of the plating step, the carbonization layer can have a thickness of 0.01 to less than 0.5 micrometers. In this context, with regard to the use of short-chained carboxylic acids, it is noted that water solubility means in particular that an amount of acid of at least 5 g/L is soluble in water at 20° C.

(3) The wire electrode carbonization layer of the present invention is formed by plating a layer of a mixture of zinc, CHO organic substance, aluminum and potassium salts with a total thickness of 1-30 micrometers on the surface of the core material, which is further processed by a carbon precipitation reaction at a high temperature. As carbon in elemental form is quite stable and does not produce compounds with copper and zinc elements, a dense carbonized layer is formed on the surface of the product. This dense carbonized layer can effectively improve the surface finish of the wire electrode. In the process of discharge, the discharge gap between the wire electrode and the workpiece is more stable, and a more uniform discharge intensity can be achieved, thereby improving the surface finish of the workpiece processed by WEDM.

(4) The phase transition layer of the wire electrode of the present invention contains carbon in elemental form. The presence of carbon reduces the vaporization temperature of the phase transition layer. In other words, under the same discharge intensity, the phase transition layer can generate a larger gasification pressure, and quickly removes the chips in the discharge gap to create the conditions suitable for the next discharge spark formation. Therefore, the discharge frequency of the wire electrode of the invention is more than 10% higher than that of the coated wire, and the processing speed thereof is also greatly improved.

(5) In the preparation process of the wire electrode of the present invention, the surface of the core material is coated with a mixture of zinc, CHO organic substance, aluminum and potassium salts, wherein the coating has a thickness of 1-30 micrometers. CHO organic matter is decomposed into elemental carbon. In the carbon precipitation process, zinc and zinc alloys of the core material are also subject to diffusion reaction. With the addition of carbon, the diffusion resistance of zinc and copper-zinc alloys is reduced, and the diffusion speed is rapidly increased. As elemental carbon is added to the diffusion reaction, the thickness of the phase transition layer is increased by over 20% compared with the conventional process, not only saving process energy consumption and time-consuming cost but also improving the processing speed of the wire electrode.

(6) In the method for preparing the wire electrode of the present invention, the tensile strength of the wire electrode produced by the carbon precipitation reaction is 150 MPa or more higher than that of the coated wire As the carbon precipitation reaction requires lower temperature and less time than the conventional process, the intermediate wire softens to a lesser extent and the toughness is better. The produced wire electrode also has better toughness and straightness. Accordingly, the wire electrode of the present invention is more suitable for automatic wire threading on the EDM machine.

(7) The preparation method of the wire electrode for WEDM provided by the invention has the advantages of simple preparation process, less equipment investment, energy saving, etc.

DESCRIPTION OF THE DRAWINGS

FIG. 1 is a schematic view showing the cross-sectional structure of the wire electrode of the present invention including (1) core material, (2) a phase transition layer and (3) the carbonized layer.

EXAMPLES

The present invention is described in further detail below by means of the figures and examples. The scope of the invention is not limited by the following illustrative examples.

A wire electrode prepared in accordance with an embodiment of the present invention has a cross section from the inside to the outside as shown in FIG. 1: the innermost core material 1, the outermost carbonized layer 3, and the phase transition layer 2 between the core material and the carbonized layer. The preparation of a wire electrode having said structure is illustrated in the following examples:

Example 1

A wire blank having the brass grade H65 (CuZn35) and a wire diameter of 0.2 mm is prepared. After alkali washing and pickling by pre-plating treatment, the surface of the wire blank is cleaned and then it is delivered to a plating tank. The bath solution is a mixed solution of 1,000 g/L of zinc sulfate, 20 g/L of dextrin having an average length of 3-15 glucose units as CHO organic matter, 15 g/L of aluminum salt and 15 g/L of potassium salt. The production speed is set at 100 m/min. The plating current is set a 900 A and the voltage is set at 8V. The plating thickness of the final electroplated wire blank is 10 μm, and the surface roughness of the electroplated wire blank is Ra 0.12 μm.

The plated wire blank is subjected to carbon precipitation reaction in an annealing furnace with a nitrogen content of 97%. The reaction temperature is 150° C., the reaction time is 10 hours, the cooling temperature is 50° C., and the furnace temperature uniformity is ±10° C.

The wire blank after the carbon precipitation reaction is washed with aviation kerosene, and after washing, it is stretched to a diameter of 0.6 mm, using a tensile speed of 300 m/min, a stress relief annealing voltage of 48 V, and an annealing current of 60 A.

The 0.6 mm diameter wire blank prepared above is treated in an annealing furnace by soft annealing; The annealing atmosphere is nitrogen, the holding temperature is 600° C., the holding time is 30 minutes, the cooling temperature is 80° C., and the furnace temperature uniformity is ±10° C.

The annealed wire blank prepared above is drawn to a finished product of 0.25 mm diameter by multi-mold continuous drawing, and then the wire blank is subjected to stress relief annealing. The process is conducted at a production speed of 1400 m/min, an annealing voltage of 35 V, and an annealing current of 50 A.

The wire electrode prepared by the above process is tested on a Mitsubishi MV1200 WEDM machine. The test work piece is SKD11 die steel having a size of 40 mm (L)×40 mm (W)×60 mm (H). The processings parameter of "one cutting and four trimmings" is selected. The test data is shown in Table 1.

The conductivity, the discharge frequency, phase transition layer thickness and tensile strength of the wire electrode prepared by the above process is determined. The data is shown in Table 2.

Example 2

A wire blank having the brass grade H65 (CuZn35) and a wire diameter of 0.2 mm is prepared. After alkali washing and pickling by pre-plating treatment, the surface of the wire blank is cleaned and then it is delivered to a plating tank. The bath solution is a mixed solution of 1,000 g/L of zinc sulfate, 20 g/L of dextrin having an average length of 3-15 glucose units as CHO organic matter, 15 g/L of aluminum salt and 15 g/L of potassium salt. The production speed is set at 100 m/min- The plating current is set at 2000 A and the voltage is set at 9V. The plating thickness of the final electroplated wire blank is 20 μm, and the surface roughness of the electroplated wire blank is Ra 0.15 μm.

The plated blank is subjected to a carbon precipitation reaction in an annealing furnace with a nitrogen content of 97%. The reaction temperature is 750° C., the reaction time is 3 hours, the cooling temperature is 80° C. The temperature uniformity in the furnace is ±10° C.

After the carbon precipitation reaction, the wire blank is washed with aviation kerosene, and after washing, it is stretched to a diameter of 0.6 mm using a tensile speed of 300 m/min, a stress relief annealing voltage of 48 V, and an annealing current of 60 A.

The 0.6 mm diameter wire blank prepared above is treated in an annealing furnace by soft annealing; The annealing atmosphere is nitrogen, the holding temperature is 580° C., the holding time is 30 minutes, the cooling temperature is 80° C., and the furnace temperature uniformity is ±10° C.

The annealed wire blank prepared above is drawn to a finished product of 0.25 mm diameter by multi-mold continuous drawing, and then the wire blank is subjected to stress relief annealing. The process is conducted at a production speed of 1400 m/min, an annealing voltage of 35 V, and an annealing current of 50 A.

The wire electrode prepared by the above process is tested on a Mitsubishi MV1200 WEDM machine. The tested work piece is SKD11 die steel with the size of 40 mm (L)×40 mm (W)×60 mm (H). The process parameter of "one main cut and four trim cuts" is selected. The data is shown in Table 1.

Conductivity, discharge frequency, phase transition layer thickness and tensile strength of the wire electrode prepared by the above process are tested. The data is shown in Table 2.

Example 3

A wire blank having the brass grade H65 (CuZn35) and a wire diameter of 1.2 mm is prepared. After alkali washing and pickling by pre-plating treatment, the surface of the wire blank is cleaned and then it is delivered to a plating tank. The bath solution is a mixed solution of 1,000 g/L of zinc sulfate, 20 g/L of dextrin having an average length of 3-15 glucose units as CHO organic matter, 15 g/L of aluminum salt and 15 g/L of potassium salt. The production speed is set at 100 m/min. The plating current is set at 900 A and the voltage at 8V. The plating thickness of the final electroplated wire blank is 10 μm, and the surface roughness of the electroplated wire blank is Ra 0.12 μm.

The plated blank is subjected to a carbon precipitation reaction in an annealing furnace with a nitrogen content of 97%. The reaction temperature is 750° C., the reaction time is 10 hours, the cooling temperature is 80° C., and the temperature uniformity in the furnace is ±10° C.

After the carbon precipitation reaction, wire blank is washed with aviation kerosene, and after washing, it is stretched to a diameter of 0.6 mm using a tensile speed of 300 m/min, a stress relief annealing voltage of 48 V, and an annealing current of 60 A.

The 0.6 mm diameter wire blank prepared above is treated in an annealing furnace by soft annealing. The annealing atmosphere is nitrogen, the holding temperature is 500° C., the holding time is 30 minutes, the cooling temperature is 80° C., and the furnace temperature uniformity is ±10° C.

The annealed wire blank prepared above is drawn to a finished product of 0.25 mm diameter by multi-die continuous drawing, and then the wire blank is subjected to stress relief annealing. The process is conducted at a production speed of 1,400 m/min, an annealing voltage of 35 V, and an annealing current of 50 A.

The wire electrode prepared by the above process is tested on a Mitsubishi MV1200 WEDM machine. The tested work piece is SKD11 die steel with the size of 40 mm (L)×40 mm (W)×60 mm (H). The process parameter of "one cutting and four trimmings" is selected. The test data is shown in Table 1.

Conductivity, discharge frequency, phase transition layer thickness and tensile strength of the wire electrode prepared by the above process is determined. The data is shown in Table 2.

Example 4

A wire blank having the brass grade H65 (CuZn35) and a wire diameter of 1.2 mm is prepared. After alkali washing and pickling by pre-plating treatment, the surface of the wire blank is cleaned and then it is delivered to a plating tank. The bath solution is a mixed solution of 1,000 g/L of zinc sulfate, 20 g/L of dextrin having an average length of 3-15 glucose units as CHO organic matter, 15 g/L of aluminum salt and 15 g/L of potassium salt. The production speed is set at 100 m/min. The plating current is set at 2800 A and the voltage at 10V. The plating thickness of the final electroplated wire blank is 30 μm, and the surface roughness of the electroplated wire blank is Ra 0.18 μm.

The plated blank is subjected to a carbon precipitation reaction in an annealing furnace with a nitrogen content of 97%. The reaction temperature is 550° C., the reaction time is 8 hours, the cooling temperature is 60° C. The temperature uniformity in the furnace is ±10° C.

After the carbon precipitation reaction, the wire blank is washed with aviation kerosene, and after washing, it is stretched to a diameter of 0.6 mm using a tensile speed of 300 m/min, a stress relief annealing voltage of 48 V, and an annealing current of 60 A.

The 0.6 mm diameter wire blank prepared above is treated in an annealing furnace by soft annealing; The annealing atmosphere is nitrogen, the holding temperature is 600° C., the holding time is 30 minutes, the cooling temperature is 80° C., and the furnace temperature uniformity is ±10° C.

The annealed wire blank prepared above is drawn to a finished product of 0.25 mm diameter by multi-die continuous drawing, and then the wire blank is subjected to stress relief annealing. The process is conducted at a production speed of 1,400 m/min, an annealing voltage of 35 V, and an annealing current of 50 A.

The wire electrode prepared by the above process is tested on a Mitsubishi MV1200 WEDM machine. The tested work piece is SKD11 die steel with the size of 40 mm (L)×40 mm (W)×60 mm (H). The process parameter of "one cutting and four trimmings" is selected. The test data is shown in Table 1.

Conductivity, discharge frequency, phase transition layer thickness and tensile strength of the wire electrode prepared by the above process are determined. The data is shown in Table 2.

Example 5

A wire blank having the brass grade H65 (=CuZn35) and a diameter of 1.2 mm is prepared. After alkali washing and pickling by pre-plating treatment, the surface of the wire blank is cleaned and then it is delivered to a plating tank. The bath solution is a mixed solution of 1,000 g/L of zinc sulfate, 20 g/L of dextrin having an average length of 3-15 glucose units as CHO organic matter, 15 g/L of aluminum salt and 15 g/L of potassium salt. The production speed is set at 100 m/min. The plating current is set at 900 A and the voltage at 8V. The plating thickness of the final electroplated wire blank was 10 μm, and the surface roughness of the electroplated wire blank was Ra 0.12 μm.

The plated blank is subjected to a carbon precipitation reaction in an annealing furnace with normal atmosphere. The reaction temperature is 200° C., the reaction time is 6 hours, the cooling temperature is 50° C., and the furnace temperature uniformity is ±10° C.

The annealed wire blank prepared above is drawn to a diameter of 0.25 mm by multi-die continuous drawing, and then the wire blank is subjected to stress relief annealing at a production speed of 1400 m/min, an annealing voltage of 35 V, and an annealing current of 50 A.

The wire electrode prepared by the above process is tested on the Mitsubishi MV1200 WEDM machine. The tested material was SKD11 grade die steel with the size of 40 mm (L)×40 mm (W)×60 mm (H). The process parameter of "one main cut and four trim cuts" is selected. The data is shown in Table 1.

Conductivity, discharge frequency, phase transition layer thickness and tensile strength of the wire electrode is determined. The data is shown in Table 2.

Example 6

A wire blank having the brass grade H65 (=CuZn35) and a wire diameter of 1.2 mm is prepared. After alkali washing and pickling by pre-plating treatment, the surface of the wire blank is cleaned and then it is delivered to the plating tank. The bath solution is a mixed solution of 1,000 g/L of zinc sulfate, 20 g/L of dextrin having an average length of 3-15 glucose units as CHO organic matter, 15 g/L of aluminum salt and 15 g/L of potassium salt. The production speed is set at 100 m/min. The plating current is set at 900 A and the voltage at 8V. The plating thickness of the final electroplated wire blank was 10 μm, and the surface roughness of the electroplated wire blank was Ra 0.12 μm.

The plated blank is subjected to a carbon precipitation reaction in an annealing furnace with normal atmosphere. The reaction temperature is 200° C., the reaction time is 6 hours, the cooling temperature is 50° C. and the furnace temperature uniformity is ±10° C.

After the carbon precipitation reaction, the wire blank is washed with aviation kerosene, and after washing, it is stretched to a size of φ 0.6 mm, a drawing speed of 300 m/min, without stress relief annealing.

The drawn blank is subjected to a heat treatment in an annealing furnace with normal atmosphere. The reaction temperature is 400° C. the reaction time is 20 hours, and the cooling temperature is controlled at below 100° C. The furnace temperature uniformity is ±10° C.

The annealed wire blank prepared above is drawn to a diameter of 0.25 mm by multi-die continuous drawing, and then the wire blank is subjected to stress relief annealing at a production speed of 1400 m/min, an annealing voltage of 35 V, and an annealing current of 50 A.

The wire electrode prepared by the above process is tested on the Mitsubishi MV1200 WEDM machine. The tested material was SKD11 grade die steel with the size of 40 mm (L)×40 mm (W)×60 mm (H). The process parameter of "one main cut and four trim cuts" is selected. The test data is shown in Table 1.

Conductivity, discharge frequency, phase transition layer thickness and tensile strength of the wire electrode prepared by the above process. The test data is shown in Table 2.

Comparative Example 1

Comparative Example 1 is selected from commercially available gamma-coated wires.

The gamma coated wire is tested on the Mitsubishi MV1200 WEDM machine. The tested work piece is SKD11 die steel with the size of 40 mm (L)×40 mm (W)×60 mm terms of processing speed, processing precision and surface finish. The threading performance is also improved.

Comparative Example 3

Comparative Example 3 is selected from commercially available composite-coated wires.

The composite coated wire is tested on the Mitsubishi MV1200 WEDM machine. The tested work piece is SKD11 die steel with the size of 40 mm (L)×40 mm (W)×60 mm (H). The process parameter of "one main cut and four trim cuts" is selected. The data is shown in Table 1.

Conductivity, discharge frequency, the phase transition layer thickness and the tensile strength of the wire electrode prepared by the above process. The data is shown in Table 2.

According to the obtained data, the wire electrodes of present invention are superior to the composite coated wire in terms of processing speed, processing precision and surface finish. The threading performance is also improved.

TABLE 1

Comparison of Processing Speed, Machining Accuracy, Surface Finish of the Machined Work piece and Threading Performance between the Examples and Comparative Examples

| Wire Electrode | Phase Structure Composition | Processing Speed | Processing [mm] | Degree of Ra [μm] | Threading Performance |
|---|---|---|---|---|---|
| Example 1 | Cu5Zn8 | 120 | ±0.002 | 0.25 | 99 |
| Example 2 | Cu5Zn8 + CuZn | 135 | ±0.001 | 0.25 | 99 |
| Example 3 | CuZn | 120 | ±0.001 | 0.25 | 99 |
| Example 4 | CuZn + Cu5Zn8 + C | 135 | ±0.001 | 0.20 | 99 |
| Example 5 | Cu5Zn8 | 122 | ±0.002 | 0.25 | 99 |
| Example 6 | CuZn | 140 | ±0.002 | 0.25 | 99 |
| Comparative Example 1 | Gama-coated wire | 100 | ±0.003 | 0.35 | 95 |
| Comparative Example 2 | Beta-coated wire | 105 | ±0.003 | 0.35 | 90 |
| Comparative Example 3 | Composite-coated wire | 105 | ±0.003 | 0.35 | 93 |

Notes:
1. The processing speed is set to 100 in Comparative Example 1
2. The threading performance test includes automatically threading 100 times on a machine with automatic threading function, and the number of successful threading is taken as the threading performance value.

(H). The process parameter of "one main cut and four trim cuts" is selected. The test data is shown in Table 1.

Conductivity, discharge frequency, the phase transition layer thickness and the tensile strength of the wire electrode is determined. The data is shown in Table 2.

According to the obtained data, the wire electrodes of present invention are superior to the gamma-coated wire in terms of processing speed, processing precision and surface finish. The threading performance is also improved.

Comparative Example 2

Comparative Example 2 is selected from commercially available beta-coated wires.

The beta coated wire is tested on the Mitsubishi MV1200 WEDM machine. The tested material is SKD11 die steel with the size of 40 mm (L)×40 mm (W)×60 mm (H). The process parameter of "one main cut and four trim cuts" is selected. The test data is shown in Table 1.

According to the data analysis, the wire electrodes of present invention are superior to the beta coated wire in

TABLE 2

Comparison of Conductivity, Discharge Frequency, Phase Change Layer Thickness and Tensile Strength between Examples and Comparative Examples

| Wire Electrode | Conductivity [% IACS] | Discharge Frequency [times/s] | Phase Change Layer Thickness [μm] | Tensile Strength [Mpa] |
|---|---|---|---|---|
| Example 1 | 23.5 | 350,000 | 15 | 1,100 |
| Example 2 | 24.5 | 400,000 | 30 | 1,050 |
| Example 3 | 24.5 | 380,000 | 20 | 1,050 |
| Example 4 | 24.5 | 400,000 | 40 | 1,050 |
| Example 5 | 22.5 | 370,000 | 15 | 1,050 |
| Example 6 | 24.5 | 415,000 | 20 | 1,050 |
| Comparative Example 1 | 19.5 | 250,000 | 5 | 900 |
| Comparative Example 2 | 20.5 | 300,000 | 10 | 800 |

TABLE 2-continued

Comparison of Conductivity, Discharge Frequency,
Phase Change Layer Thickness and Tensile Strength
between Examples and Comparative Examples

| Wire Electrode | Conductivity [% IACS] | Discharge Frequency [times/s] | Phase Change Layer Thickness [μm] | Tensile Strength [Mpa] |
|---|---|---|---|---|
| Comparative Example 3 | 20.0 | 280,000 | 15 | 850 |

It can be concluded from the above examples and experimental data that the wire electrode prepared by the method of the present invention has higher processing precision, surface finish and threading performance compared with the conventional wire electrode and has a more ideal electrical conductivity, discharge frequency and tensile strength.

The invention claimed is:

1. A wire electrode for wirecut electrical discharge machining (WEDM) having a carbonaceous surface layer, wherein the wire electrode comprises a core material, an outermost carbonization layer made from CHO organic matter, and a phase transition layer between the core material and the carbonization layer, wherein the phase transition layer is a copper-zinc phase structure, wherein said structure is composed of one, two or more metal compounds selected from CuZn, Cu5Zn8, or CuZn3, and wherein the thickness of the phase transition layer is 1 to 40 μm, wherein carbon is also present in the phase transition layer and the content of elemental carbon in said phase transition layer is less than 50 wt.-%, wherein the remainder is copper, zinc and other unavoidable impurities, wherein the carbonization layer has a carbon content of 0.1 to 99.0 wt.-% and an aluminum and potassium content of less than 0.5 wt.-%, wherein the remainder consists of copper and zinc and other unavoidable impurities selected from the group consisting of oxygen, hydrogen and nitrogen, and wherein the other unavoidable impurities in the phase transition layer are selected from the group consisting of oxygen, hydrogen, nitrogen, aluminum and potassium and wherein the total content thereof is less than 0.50 wt.-%.

2. The wire electrode according to claim 1, wherein the carbonization layer has a thickness of 0.01 to 30 μm or 0.5 to 30 μm and is present in a continuous or discontinuous form.

3. The wire electrode according to claim 1, wherein the core material is one of brass, copper and carbon steel.

4. The wire electrode according to claim 1, wherein the content of unavoidable impurities in the carbonization layer is less than 0.5 wt.-%.

5. A method for preparing a wire electrode for wirecut electrical discharge machining (WEDM) having a carbonaceous surface layer, said method comprising:

(1) preparing a brass wire blank, a copper wire blank or a carbon steel wire blank having a diameter of 0.3 to 1.5 mm by plating a layer of a mixture of zinc, CHO organic matter, aluminum salt and potassium salt on the surface of the wire by online continuous electroplating, wherein the content of CHO organic matter in the mixture is less than 0.5%, wherein the content of aluminum and potassium salts is less than 0.5%, relative to the total mixture, and wherein the remainder is zinc, wherein the layer of the surface-plated mixture has a thickness of 1 to 30 μm on the surface of the blank;

(2) subjecting the plated blank to a carbon precipitation reaction, in a closed environment containing 90% or more of nitrogen, wherein the reaction temperature is 100 to 900° C., the reaction time is 0.5 s to 20 hrs, and the cooling temperature is controlled at below 100° C., wherein the temperature of the furnace is uniform within ±10° C.;

(3) cleaning the wire blank after the carbon precipitation reaction using a volatile aviation kerosene and pre-stretching and stress-relieving the wire blank to a diameter of 0.1 to 1.0 mm, the tensile speed of the pre-stretching step being form 100 to 900 m/min and the voltage of the stress-relieving annealing step being 5 to 100 V at an annealing current of from 5 to 100 A;

(4) placing the wire blank having a diameter of from 0.1 to 1.0 mm as obtained in step (3) in a furnace for an annealing treatment with the annealing conditions being as follows nitrogen, holding temperature 200 to 600° C., holding time 30 to 600 min, cooling temperature controlled below 200° C., and temperature uniformity in the furnace±10° C.;

(5) continuously drawing the annealed wire blank to a finished product diameter of 0.02 to 0.35 mm and subjecting it to stress relief annealing with the pass processing rate controlled at 5 to 25%, the total processing rate controlled at 50 to 89% and the tensile speed controlled at 500 to 1,800 m/min, wherein the stress relief annealing voltage is 20 to 40 V and the annealing current is 10 to 60 A.

6. The method according to claim 5, wherein the surface roughness of the coated wire blank is Ra 0.05 to 0.2 μm and wherein the final wire has a tensile strength of 500 to 2,500 mPa and a conductivity of 15 to 95% IACS, and wherein the final wire allows for a processing speed when used as a finished wire electrode of 1.15 to 1.35 times that of a coated wire having a high-zinc alloy coating on its surface.

7. The method of claim 5, wherein the CHO organic matter is selected from dextrins, polyethylene glycols or short-chained carboxylic acids, wherein the chain length is such that the acid is soluble in water, and combinations thereof.

8. The method of claim 7, wherein the dextrin has an average length of 3 to 15 glucose units.

* * * * *